Figure 1:
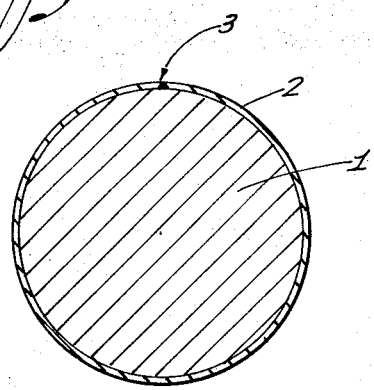

United States Patent [19]
Ziemek et al.

[11] 3,781,982
[45] Jan. 1, 1974

[54] METHOD OF MAKING A SUPERCONDUCTOR

[75] Inventors: Gerhard Ziemek, Hannover; Ernst Scheffler, Langehagen, both of Germany

[73] Assignee: Kabel-und Metallwerke Gutehoffnungshutte Aktiengesellschaft, Hannover, Germany

[22] Filed: Feb. 18, 1972

[21] Appl. No.: 227,367

Related U.S. Application Data

[62] Division of Ser. No. 884,846, Dec. 15, 1969, abandoned.

[52] U.S. Cl.............................. 29/599, 174/DIG. 6
[51] Int. Cl. ........................................... H01u 11/08
[58] Field of Search ................. 174/126 R, 126 CP, 174/28, 110 F, 107, DIG. 6; 29/599; 138/171, 139

[56] References Cited
UNITED STATES PATENTS

| | | |
|---|---|---|
| 2,677,765 | 5/1954 | Collins .......................... 174/126 X |
| 2,740,095 | 3/1956 | Somes ............................. 174/28 X |
| 2,936,435 | 5/1960 | Buck .............................. 335/216 X |
| 2,989,480 | 6/1961 | Matthias ....................... 335/216 X |
| 3,443,305 | 5/1969 | Matsuda ..................... 174/126 R X |
| 3,567,846 | 3/1971 | Brorein .......................... 174/110 F |
| 3,657,809 | 4/1972 | Lehnert .......................... 174/107 |

FOREIGN PATENTS OR APPLICATIONS

| | | |
|---|---|---|
| 1,452,825 | 8/1966 | France ........................... 174/DIG. 6 |
| 1,809,814 | 8/1969 | Germany ....................... 174/DIG. 6 |
| 343,163 | 2/1931 | Great Britain ................ 174/126 CP |

*Primary Examiner*—E. A. Goldberg
*Attorney*—Smyth, Roston & Pavitt

[57] ABSTRACT

A superconductor is provided as a tube made from a self-supporting thin sheet with axial welding seam and attached to a separately made carrier, either as an outside envelope or, in case of a tubular carrier, as an inside lining, but always in intimate contact with the respective cylindrical carrier surface.

1 Claim, 2 Drawing Figures

PATENTED JAN 1 1974　　3,781,982

INVENTORS:
Gerhard Ziemeck
Ernst Scheffler

ATTORNEYS

METHOD OF MAKING A SUPERCONDUCTOR

The present invention relates to a conductor made of superconductive material and to a method of making such a conductor. Low-temperature cables, also called cryogenic cables, have been used for the transmission of electrical energy. The conductors in such a cable are disposed in the interior of a pipe or tube filled, for example, with liquid helium. Protection against inflow of heat from the environment is provided by means of one or more additional pipes concentrically receiving the pipe which contains the conductors and is filled with liquid helium. For example, four concentric pipes can be provided and arranged as follows: The space between the innermost pipe and the second one with next larger diameter is evacuated and a high vacuum is maintained during operation. The space between the second pipe and the third pipe receiving the second one is, for example, filled with liquid nitrogen in order to provide a controlled distribution of the temperature gradient from the innermost tube toward the outer environment. The space between the third and the last pipe receiving the third pipe is again evacuated, and the last outermost pipe is presumed to assume ambient temperature.

The conductors themselves for such a cable are known to include two concentrically disposed carriers, the inner carrier thereof has on its outer surface a layer of particularly superconductive material while the inner surface of the outer carrier is likewise provided with a layer of such a material. It is furthermore known, to use plural conductors in a divided, multiconductor system instead of a single conductor with comparatively large cross section; the conductors of the plurality having relative smaller cross section and are connected in parallel.

Generally speaking, the electrical conductors in a cryogenic system are comprised of a material which can assume superconductive state, or there are provided carriers which can be layered with a material which can be brought into superconductive state. Lead, niobium and some niobium alloys and compounds have become known as being suitable superconductive material. Accordingly, the superconductors themselves can be made of such a material. However, transmission of energy is usually restricted to a thin layer near the surface of a conductor because of current displacement (skin effect). Therefore it suffices if a carrier is in fact provided with a thin layer of such a superconductive material. Such a layer is provided onto the carrier by means of electrolysis or vapor depositing.

The invention has as its principal object the providing of superconductor structure which has resulted from development in that field but leading in a different direction. In accordance with the invention, a sheet or foil having thin wall thickness is made from material being susceptible to assuming superconductive state. The sheet thus being provided is a regular metallic sheet and can be described as self supporting. The thin sheet of superconductive material is described as self supporting to the extent that it can be handled and worked as a separable entity, even though for practical employment it may require backing or support to prevent deformation. That sheet is arranged and disposed onto one or several carriers or backing members. Such a construction can be made on a continuous basis and by suitable selection of the carrier or backing member the structure can be made a flexible one without difficulties. Essential, however, is that the thin sheet is made separately from the carrier or backing member so as to have some stiffness at least to permit its designation as a sheet or foil. A thin sheet as cover on a carrier but having been made as separate foil or sheet is mechanically stronger, sturdier and more abrasion proof than a layer which has been deposited on a carrier by means of electrolysis or by vapor depositing.

As was mentioned above, only the outer surface regions of a conductor participate materially in the transmission of electrical energy (A.C.). For this reason the sheet is selected to be very thin, for example, having a thickness of 0.03 to 0.5mm. Preferably, the thickness is selected from within the range from 0.05 to 0.2mm. Niobium and its alloys have a higher critical transition temperature than lead where the material changes from the state as regular resistor to the superconductive state. Niobium and its alloys need to be cooled only to $-259°$ to $-265°C$. whereas lead has to be cooled down to $-267°C$. For this reason niobium, its alloys and suitable compounds are preferred.

Niobium and its alloys are rather expensive so that it appears to be of advantage to use a thin, superconductive sheet which is reshaped into a pipe or tube and adjoining edges are welded together. Such a thin-walled pipe, however, is unfortunately mechanically quite weak and not at all sturdy, i.e., it is rather easily susceptible to deformation. Usually such conductors are wound on drums for transportation, but if a thin-walled sheet has been reshaped into a pipe it is necessary to select very large drums as such thin-walled pipes must not be curved sharply as they deform rather easily. For this reason, there must be provided a backing member or carrier. The backing member may be provided in the interior of the thin-walled sheet tube as an outer cover on the backing member and being firmly seated thereon; alternatively the thin-walled sheet may constitute a lining of the interior of a tubular backing member.

The carrier may be comprised of a metal wire, for example, a copper wire. However, it is desirable to use a low-weight material so that a core of plastic material such as a plastic string may be more advantagous for employment as carrier and backing member to prevent deformation of the tubular superconductive sheet. The tubular superconductive sheet is fastened to a plastic backing member in the following manner: After the thin-walled pipe has been placed onto a plastic cylindrical or tubular carrier, the pipe is heated whereupon the plastic expands, softens and is glued and bonded to the pipe. The carrier which is disposed in the interior of the superconductive pipe preferably has a diameter of 1 to 4mm.

Figure 2:
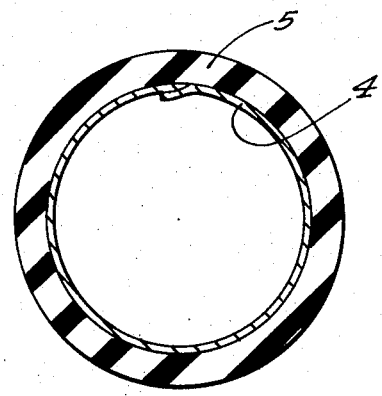

A backing member for a thin-walled superconductive tube can be provided and connected thereto as follows: Liquid plastic is extruded onto the pipe to form a coating thereon. After solidification the tubular superconductor forms an interior lining of the now formed plastic tube. The superconductive structure in this case is tubular and hollow, and it is of advantage, particularly for increasing the cooling effect during operation to pass the coolant, such as liquid helium, through the interior of the pipe. While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a cross section through a superconductor on a carrier or backing member;

FIG. 2 is a cross section through a superconductor made of a thin tape forming the interior lining of a tubular plastic carrier or backing member. Proceeding now to the detailed description of the drawings, in FIG. 1, thereof there is illustrated a carrier element or backing member 1 which is constituted, for example, by a metallic wire such as a copper wire. In the alternative, the carrier can be made of plastic, for example, polymethacrylic acid ester, polypropylene or a polyethylene copolymer, polyacrylacid ester or the like.

A sheet or tape of superconductive material 2 has been deformed to provide a tube and the long sides of such a tape have been welded together preferably through butt welding. The welding seam 3 extends in axial direction, accordingly. The sheet or tape 2 was originally flat and has been reshaped to assume tubular configuration. After welding adjoining edges the superconductive sheet forms in fact a tube or tubular jacket which now is applied upon the carrier 1. In case the core carrier or backing member 1 is made of plastic, conductor tube 2 is heated so that the plastic carrier therein is likewise heated and bonded to the interior wall of tube 2.

Turning now to FIG. 2 there is illustrated a different embodiment for a superconductor in accordance with the present invention. There is a tape-like sheet 4 of superconductive material which has been reshaped into a pipe. In this case now, the resulting tube is enveloped by a plastic layer 5 likewise having the form of a tube, the inner wall of which being lined by superconductive, thin-walled tube 4. The plastic used is preferably a copolymer of polyethylene which has been modified by monomers. In this way one can obtain a very good bonding of the metallic pipe 4 to the inner wall of plastic tube 5.

In this embodiment, again a thin tape of superconductive sheet or foil material is shaped into a tube 4. Now the plastic material about to establish the backing member or carrier is extruded in the liquid state onto the outside of tube 4. However, it has to be observed that in this case the plastic tube actually renders the cooling of the superconductor tube 4 from the outside more difficult. However, is has to be ovserved also that due to bonding of tube 4 to tube 5 the shape of the conductor tube 4 is readily maintained by the stiffness of pipe 5. Therefore, it is not necessary in this case to include a carrier core in the interior of the conductor tube 4. This, in turn, permits utilization of the interior of thin-walled tube 4 as passage to the coolant, such as liquid helium, to maintain the conductor tube 4 in the superconductive state. The fact that the tube 4 is clad in a heat-insulating plastic coat 5, on the other hand, serves as an additional insulation of the cryogenic system against heat influx from the interior.

The invention is not limited to the embodiments described above but all changes and modifications thereof not constituting departures from the spirit and scope of the invention are intended to be included.

I claim:

1. The method of making a superconductive arrangement, comprising:
    providing a thin tape of superconductive material as a self supporting foil, and having thickness in the range of 0.03 mm to 0.5mm;
    bending the tape longitudinally into tubular configuration to obtain axially adjoining edges;
    welding the edges to obtain an axial seam; and
    extruding a plastic material as carrier onto the tubular configuration so that the interior of the tubular configuration remains empty.

* * * * *